United States Patent
Lattin et al.

(10) Patent No.: US 12,394,161 B2
(45) Date of Patent: Aug. 19, 2025

(54) EXTENDED REALITY (XR) 360° SYSTEM AND TOOL SUITE

(71) Applicant: OurWorlds, Inc., San Diego, CA (US)

(72) Inventors: Kilma S. Lattin, Pala, CA (US); Catherine Eng Helmuth, San Diego, CA (US); Maximilian Mackh, Obertauern (AT)

(73) Assignee: OurWorlds, Inc., San Diego, CA (US)

( * ) Notice: Subject to any disclaimer, the term of this patent is extended or adjusted under 35 U.S.C. 154(b) by 259 days.

(21) Appl. No.: 18/323,313

(22) Filed: May 24, 2023

(65) Prior Publication Data

US 2023/0386152 A1    Nov. 30, 2023

Related U.S. Application Data

(60) Provisional application No. 63/365,240, filed on May 24, 2022.

(51) Int. Cl.
*G06T 19/00* (2011.01)
*H04N 13/189* (2018.01)

(52) U.S. Cl.
CPC ......... *G06T 19/006* (2013.01); *H04N 13/189* (2018.05)

(58) Field of Classification Search
None
See application file for complete search history.

(56) References Cited

U.S. PATENT DOCUMENTS

| | | | |
|---|---|---|---|
| 2007/0214023 A1* | 9/2007 | Mathai | G01W 1/00 705/4 |
| 2018/0054568 A1* | 2/2018 | Sugawara | G02B 27/017 |
| 2018/0176166 A1* | 6/2018 | Philipson | H04L 51/222 |
| 2020/0410713 A1* | 12/2020 | Auer | G06T 7/11 |

FOREIGN PATENT DOCUMENTS

WO    WO-2019188861 A1 * 10/2019 ............. G02B 1/118

\* cited by examiner

*Primary Examiner* — Tapas Mazumder

(57) ABSTRACT

The disclosed technology generates a shareable augmented reality experience of an environment. A 3D sphere is generated based on spatial data from the environment captured by a visualization sensor. A gradient layer is generated based on the detected movements of a handheld mobile device using a gyroscope sensor and an accelerometer sensor. An environment layer is generated based on overlapping the gradient layer with live feed of the environment. After augmenting the two layers, the handheld mobile device can generate the shareable augmented reality experience. The handheld mobile device can receive user preferences on where or who to share the experience to before publishing it. After the augmented reality experience is shared, another user can view the content on their device.

20 Claims, 11 Drawing Sheets

Our Worlds application use-case: cultural and historical narratives from Native America

360° volumetric figures overlaid on XR360° Environment. Line / point-cloud aesthetic applied to volumetric characters intended to portray notable Native American figures in an elevated aesthetic to avoid "uncanny valley" 3D character design.
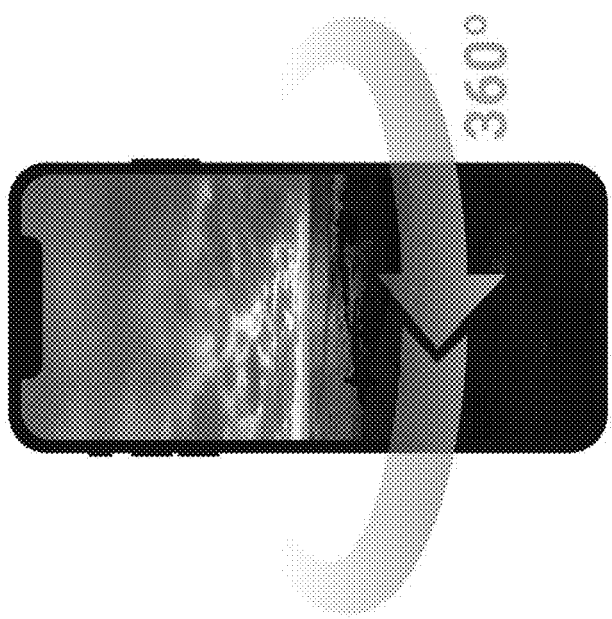
Figure 7
XR360° Composite Layer Environment

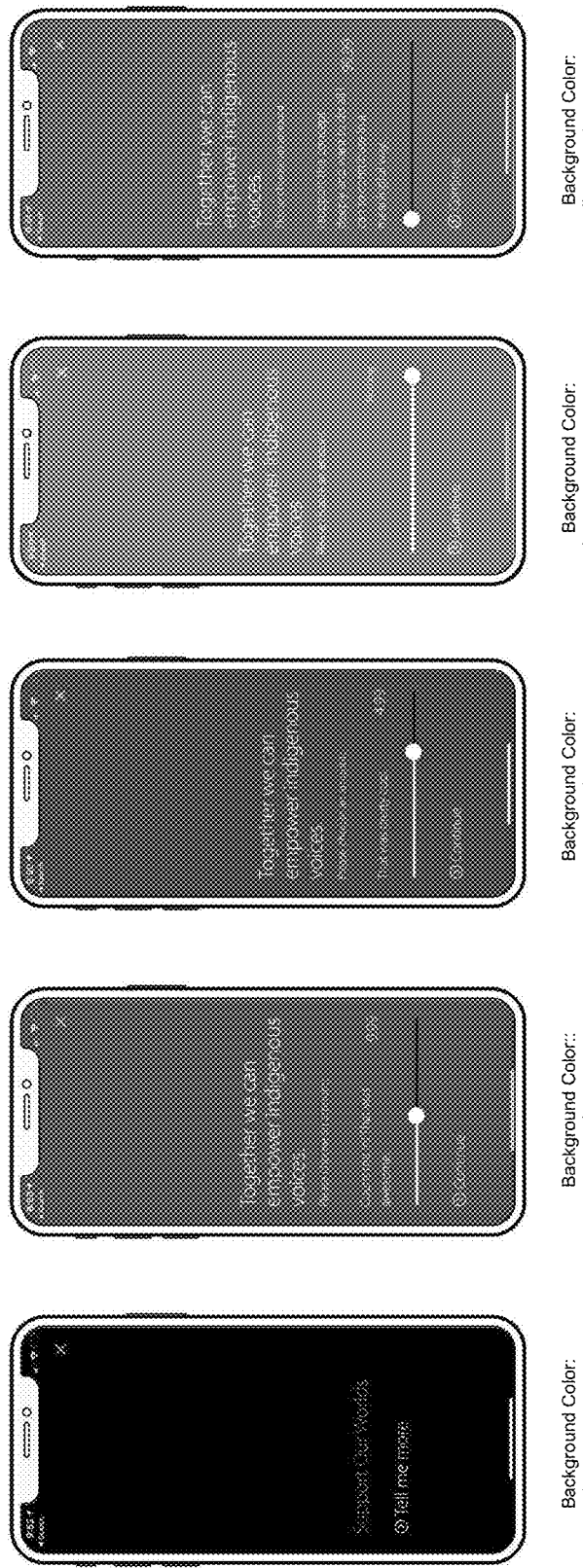

Figure 8
OurWorlds Experiential Fundraising System

Background Color: #000000 / black

Background Color:: #d15159 / warm coral

Background Color: #a729a5 / magenta

Background Color: #dd4a29 / deep orange

Background Color: #8e9ea3 / cold grey

From left to right: 1) Once the user exits an experience, they are presented with this screen. There are two choices: Tell Me More and exit (the button on the top right corner). 2) Once user selects Tell Me More, they arrive at a slider UI. The app editor can determine a default position and amount as an appropriate mid-range ask. They can also assign a background color deemed to be pleasing to the intended audience. 3) Sliding to the right decreases the amounts while changing the background color into subtly increasingly less comfortable tones. 4) Sliding all the way to the right desaturates the background into a grey, and replaces the amount with the word, Nothing, which is intended to produce a slightly jarring or discomfiting effect. 5) Sliding to the left increases the amounts, while the background color becomes increasingly more pleasing.

EXTENDED REALITY (XR) 360° SYSTEM AND TOOL SUITE

CROSS-REFERENCE TO RELATED APPLICATION

This patent application claims the benefit of U.S. Application No. 63/365,240 filed May 24, 2022.

TECHNICAL FIELD

The disclosed teachings generally relate to extended reality experiences, where virtual environments are linked to the real world.

BACKGROUND

There are applications that provide users with the ability to view 360° video. Conventional video systems include YouTube, Vimeo, and 360vuz. Users discover and select 360° videos on these apps within a user interface format typical of current social media platforms, such as a list or tile-based user interface.

Augmented reality (AR) applications also exist and allow the ability to see and/or place virtual 3D objects in the camera view of a mobile device. This makes it appear that the virtual 3D objects exist within the space framed within the device camera view.

Location-based AR applications enable the use of geolocation to place AR content. Examples include Apple ARKit and Wikitude AR SDK. Applications such as this can use device geolocation and provide location-based content.

Augmented reality applications can also view crowd-sourced content.

SUMMARY

The present application describes techniques to provide a geolocated 360° extended reality social media platform comprised of updated modes and elements as described herein. The system includes systems, methods, and user interfaces for displaying a crowd-sourced inventory of location-based extended reality content experiences to a user.

Embodiments provide a user interface that allows application users to discover content by location within a geographic map, as well as by time period within a timeline interface. The system also provides methods for application users to upload, create, share and experience a wide variety of extended reality experiences. The system renders these rich extended reality experiences in a novel, performant format that makes it possible to view them on lower-powered mobile devices with minimal bandwidth requirements or in a full-bandwidth system.

BRIEF DESCRIPTION OF THE DRAWINGS

Detailed descriptions of implementations of the present invention will be described and explained through the use of the accompanying drawings.

FIG. 5B is a schematic diagram that illustrates an XR 360° camera view overlay.

FIG. 7 is a block diagram that illustrates an XR 360° composite layer.

FIG. 8 is a block diagram that illustrates an experiential fundraising system.

DETAILED DESCRIPTION

Extended Reality (XR) is used throughout this application to refer to an amalgamation of different digital realities such as augmented reality (AR), virtual reality (VR), mixed reality, and other representational paradigms in a format as described herein.

The inventors recognize and explain herein how the field of XR offers transformative new approaches to storytelling. The technologies behind AR and VR have the ability to provide deeply compelling and immersive sensory experiences. An audience can leave these experiences with profound new emotional connections to the characters and narratives within these platforms.

People are hardwired to respond physiologically to their environments and the people within them. Virtual environments offer viewers a palpable sense of presence and engagement and can deliver the kind of insight and perspective that have the potential to radically alter the way audiences understand history and current events.

The disclosed technology includes user tools and experiences that advance how augmented and virtual reality content are created and consumed. These are collectively referred to here as the "Our Worlds" XR 360° creator tools and our worlds experiential formats.

In this paradigm, powerful, immersive experiences of any length can be created and shared by non-technical users. The technology includes a set of tools (Our Worlds XR360° creator mediation tools, also see FIGS. 1, 2 and 4) that enable creators to create, import, combine, and otherwise manipulate media in the application's 360° XR formats (Our Worlds XR360° environment layer and Our Worlds XR360° composite layer, see FIGS. 1, 3, 4 and 7) and share novel extended reality experiences. Media that can be used in the Our Worlds XR360° environment layer include but are not limited to audio, 360° video, volumetric video, 360° volumetric video, 2D video, 3D volumetric figures and objects, photographs, panoramic photographs, and 2D holograms. Further, a creator can specify geocoordinates for a given experience in a novel map-based UI, while also specifying when content is available on a timeline (see FIG. 5).

Figure 1:
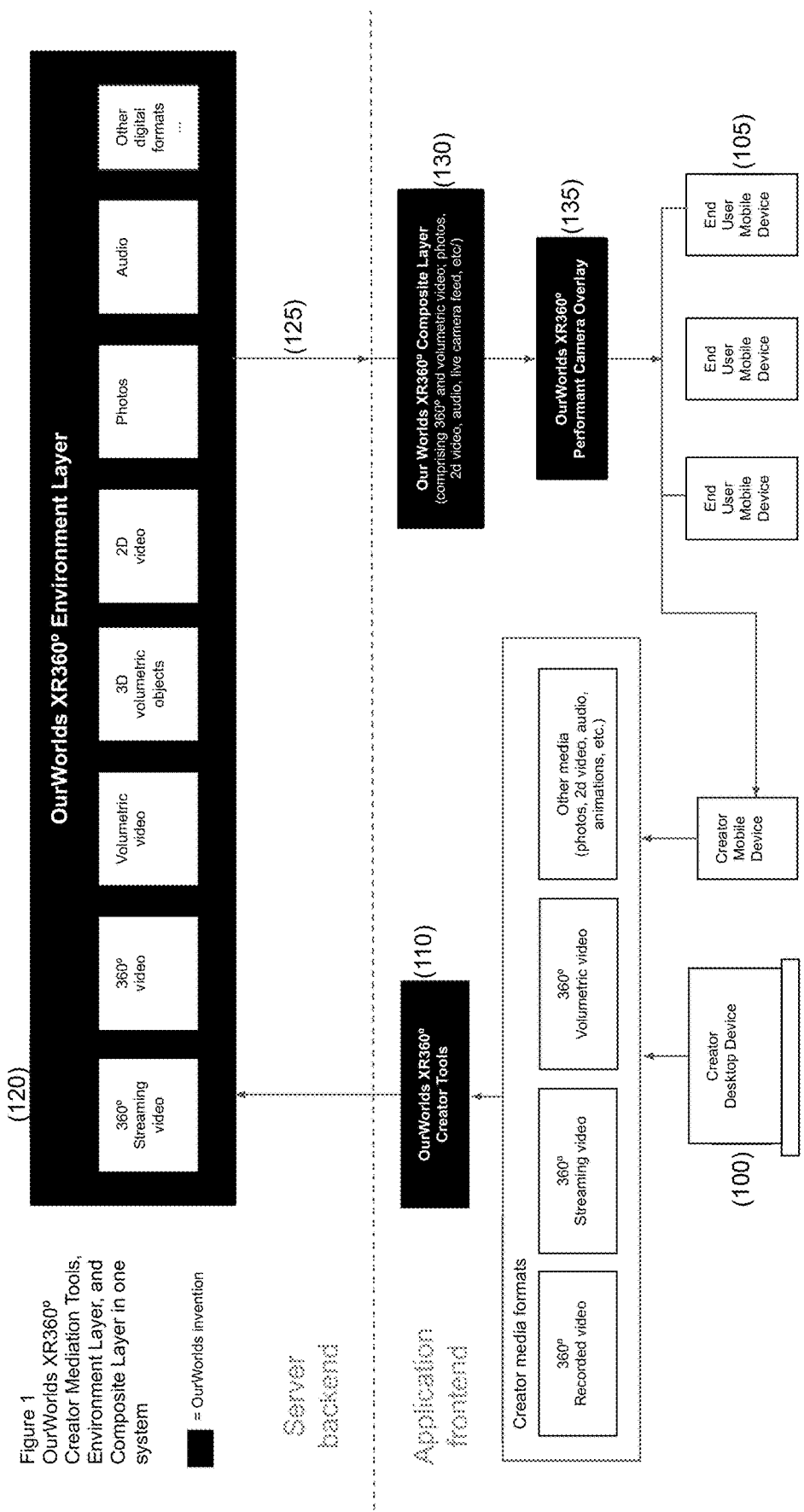
FIG. 1 is a block diagram that illustrates an XR 360° system.
Figure 2:
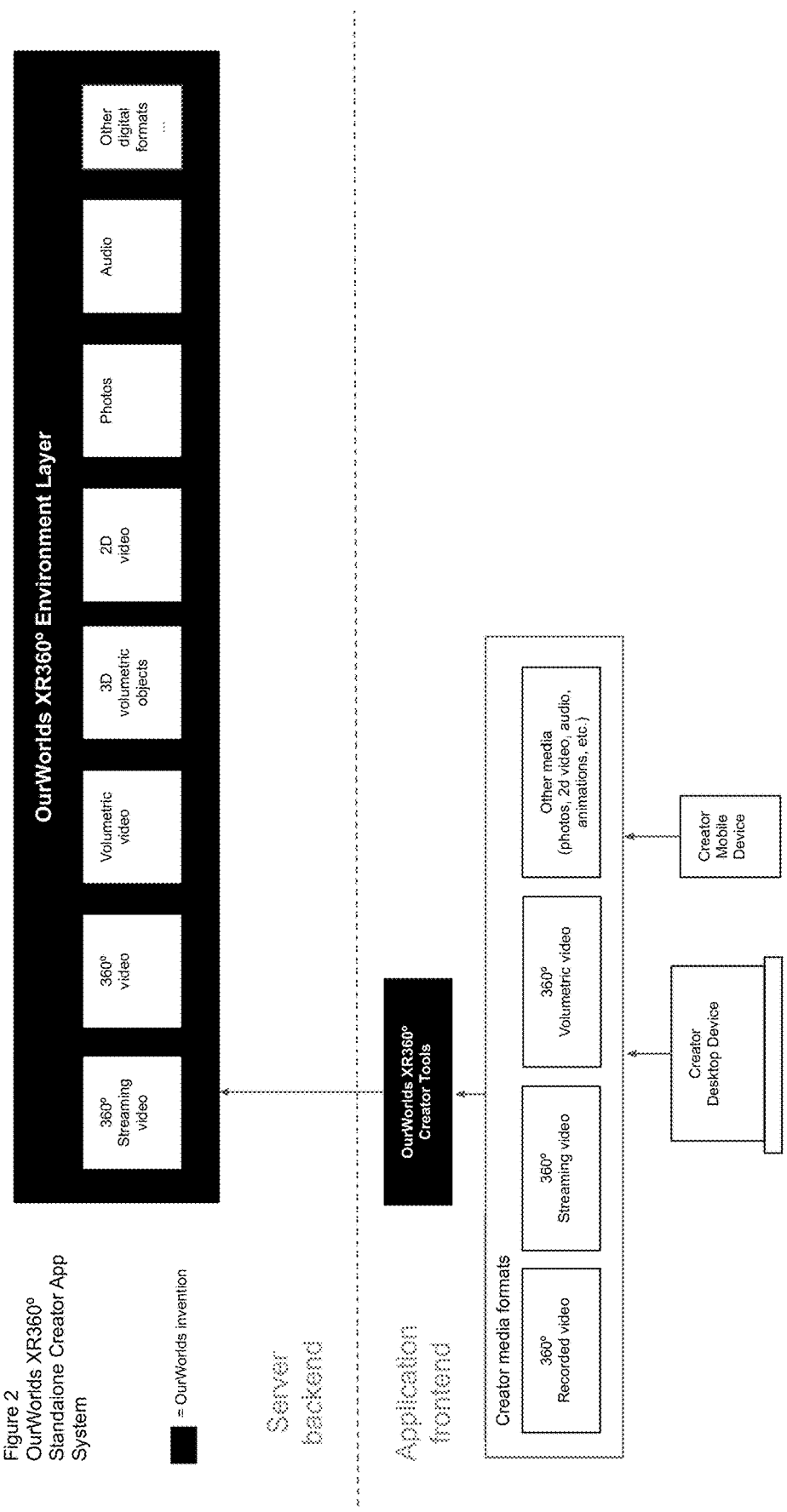
FIG. 2 is a block diagram that illustrates an XR 360° creator application ("app") system.

In embodiments, the tools can reside in layers that exist between the creator device shown as 100 in FIG. 1 and the end-user devices, for example mobile devices shown as 105 in FIG. 1. The creator tools 110 are used by the creator devices 100 to create the actual media or content 120. The content is stored as an environment layer 120, which stores content including 360 or volumetric video, and objects and other formats.

Figure 4:
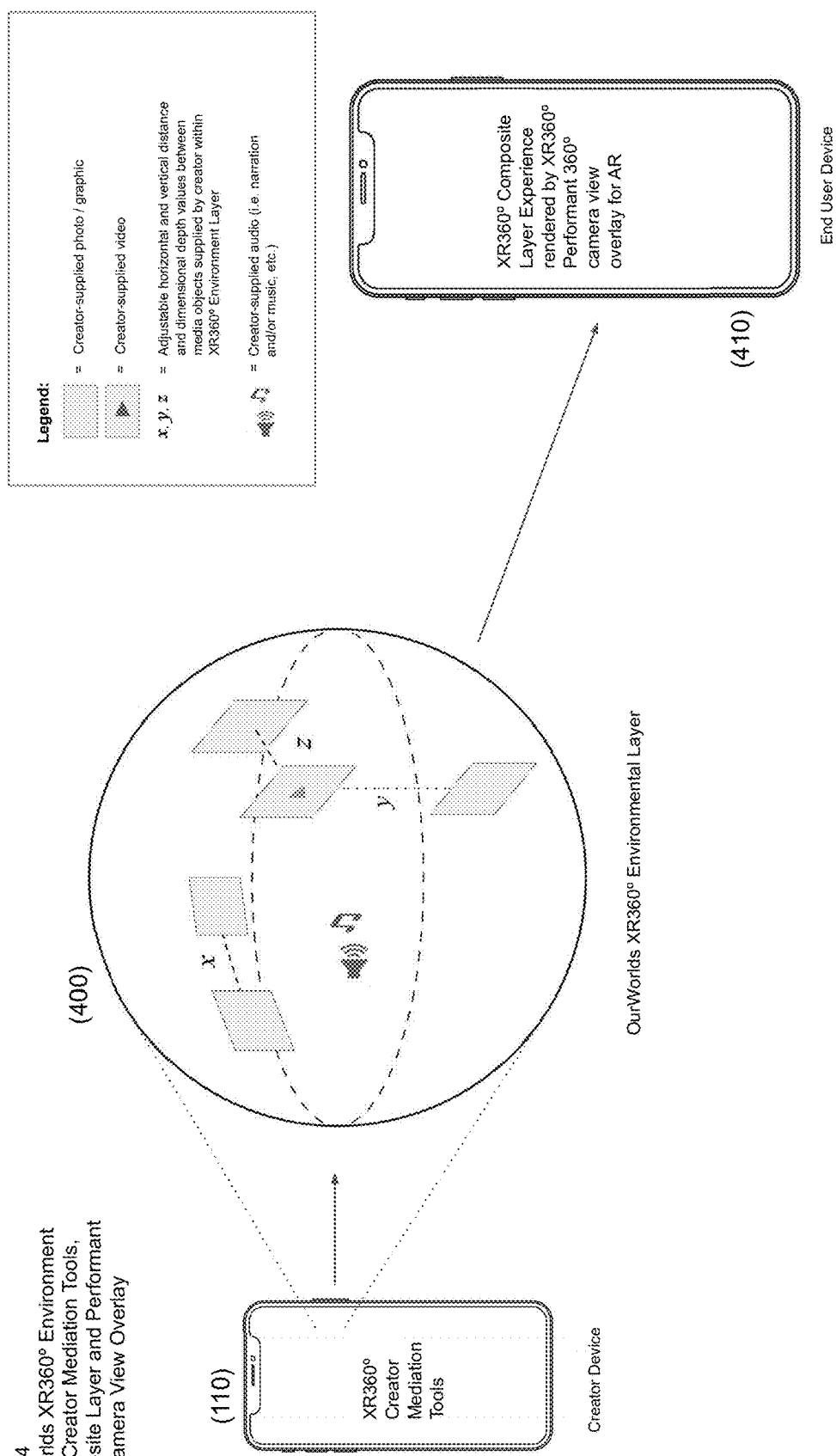
FIG. 4 is a schematic diagram that illustrates an XR 360° system.

FIG. 4 illustrates the environmental layer 400 that sits between the creator tools 110 and the composite layer experience shown as 410 shown on an end-user device. The environmental layer, as shown, can have X, Y and Z orthogonal content including music, sound, and others.

Figure 5:
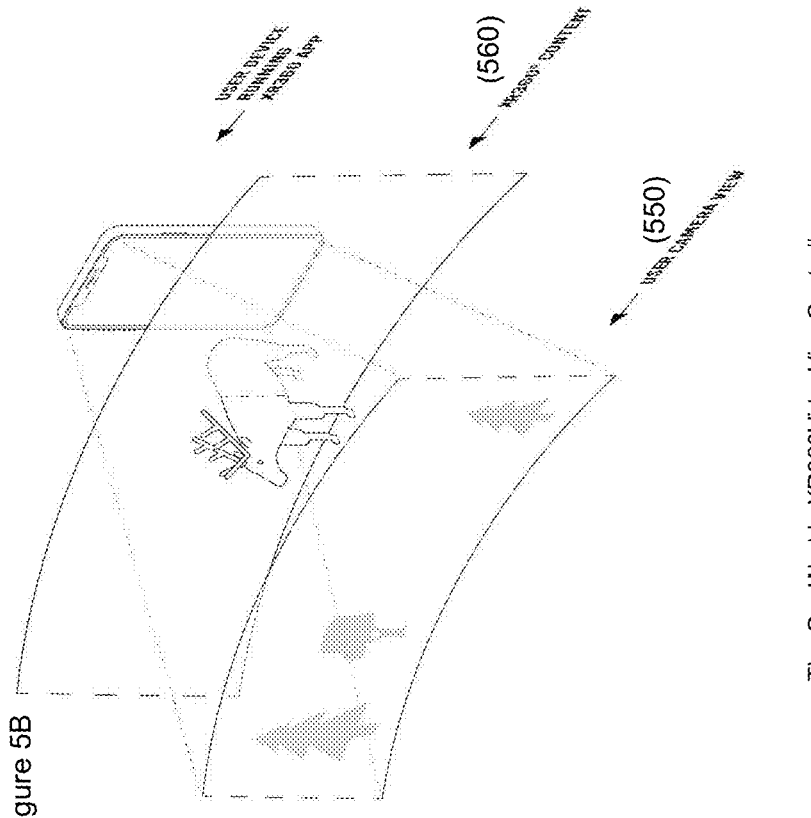
FIG. 5 is a schematic diagram that illustrates an example of augmented reality (AR) media content.

FIG. 5 illustrates how a 360° camera view overlay is used for AR, where the AR content 500 is displayed over a 3D camera view 510 on user devices 520.

FIG. 5B shows the difference with the Our World system, where the camera view includes content for both the front view 550 and the rear view 560.

Figure 6:
FIG. 6 is a block diagram that illustrates an example of an XR 360° system.

FIG. 6 illustrates an embodiment, where the Our World application's use case includes cultural and historical narratives from Native America.

FIG. 7 shows a 360 volumetric figure overlaid on the 360° environment.

The content 125 is served from the environment layer via a composite layer 130, which creates the content and serves it beneath a camera overlay 135.

In cultural institutions such as museums and academic learning centers, there is a growing call for the participation of primary source contributors to shape indigenous narratives. For example, a museum might provide an interactive exhibition, where visitors can contribute content to an exhibition using conventional formats such as drawings, photographs, or writing, which are then displayed within the museum galleries.

The disclosed technology provides an innovative new tool that enables creators of content, e.g., indigenous creators, to choose what they want to show, where they want to show it in the world by specifying coordinates on a map that may indicate an indoor or an outdoor space; as well as when to make it available, either a date in the future, or in the past, made accessible by the Our Worlds application timeline UI. The Our Worlds timeline UI is designed to accommodate a timescale beginning in prehistoric times until the present. The application also includes methods that provide cutting-edge AR/VR tools for how they want to show it.

An aspect of this platform allows it to provide rich, immersive AR/VR and other XR experiences using novel methods that use lesser bandwidth and have minimal device processor requirements. This makes media available that is otherwise only available on high-end VR devices. Thus, the application can be a powerful tool for distance learning, especially for underserved communities where connectivity and bandwidth are in short supply. Additionally, the simplicity of the workflow and the low storage requirements make it a great candidate for distribution on non-wireless delivery, for example, a novel toolset within this application makes it possible for ATSC 3.0-enabled television stations to push this content for devices in areas that are hard to reach by conventional broadband connectivity.

This app has the potential to enable indigenous people all over the world to reclaim their stories and take control of their historical narratives; by enabling them to reframe their history out of textbooks and into an experiential realm, the technology helps the public arrive at a greater truth, awareness, and understanding about the indigenous experience.

Arts and culture use-case examples are also contemplated. In addition to being an exemplary use case for indigenous culture, the application provides use-case opportunities in the world of the performing arts. Recorded and live-streamed 360° videos and other XR and interactive content of concerts and other music or cultural events would similarly benefit from the Our Worlds XR360° Creator Tools and Experiential Formats.

Figure 3:
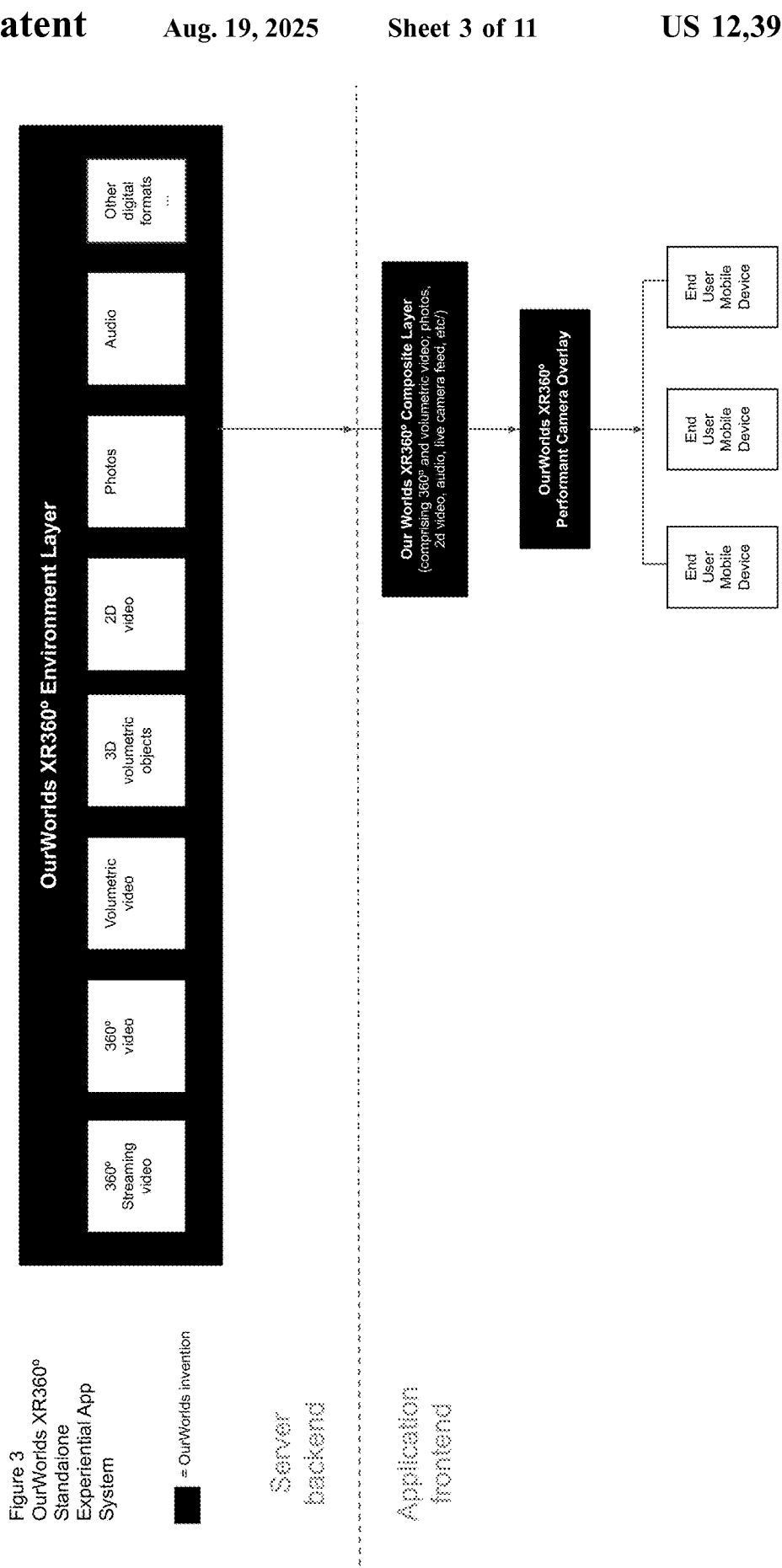
FIG. 3 is a block diagram that illustrates an XR 360° experiential app system.

The front-end application can be used with an experiential mode powered by the Our Worlds performant XR360° camera view overlay and a creator mode. These camera mode and creator modes can be included together in a single application (see FIG. 1), or they can each exist as standalone applications, where FIG. 2 uses just the creator tools, and FIG. 3 shows just the experiential features.

The Our Worlds XR360° experiential mode uses an Our Worlds user interface which includes a map-based user interface that provides app users with a mode of content discovery based on a geographical location. The interface presents app users with a map of the world that displays markers identifying content relevant to a particular set of geocoordinates. The content may be accessed by application users from anywhere in the world within the app in a universally available app mode, or that can be made to be accessed only within a predetermined range encircling a specified set of geocoordinates in a site-specific mode. Upon tapping on one of the markers, the app users will enter a 360° XR experience specific to that location. An introduction screen with images and text determined by the creator describes the ensuing experience. Once the user elects to continue by tapping a button on the screen, a viewing instruction will appear if available, and the experience will begin, as shown in FIG. 6. Should the experience be site-specific and not local to the user's location, an additional screen will appear offering an explanation and alternative sites to visit. The experience may be viewed on a mobile device either monoscopically or stereoscopically, by choosing an option on the user interface which toggles between the two modes.

Additional markers appear on the map dynamically as content creators upload and place new experiences to the app. App users can also identify themselves on the map by a unique user geolocation marker in a contrasting color.

The Our Worlds application also includes a timeline-based user interface superimposed on the map. Scrubbing back and forth across this timeline will show or hide map location markers depending on whether the content they represent are relevant to the date selected on the timeline (see FIG. 6).

Our Worlds content experiences: upon entering the experience, app users are presented with introductory text and any instructions specified by the content creator. Instructions might include for example simple guidance such as standing up during an experience, turning in place slowly in 360°, holding the phone at a particular angle, moving the phone in particular ways during the experience, and other possibilities.

The 360° XR experiences may be any length, from several seconds to movie feature length. Experience formats include but are not limited to: Our Worlds XR360° composite layer, which includes 2D video, photographs, a collection of photographs, audio, and text that adhere to a 360° virtual space rendered within the app by the XR360° methods disclosed herein. (See FIGS. 1 and 4)

Virtual reality 360° videos (hereafter referred as VR360° video) can refer to immersive video content that provides a complete 360° field of view.

Live-streamed virtual reality 360° videos can refer to immersive video content that was live-streamed that includes a complete 360° field of view.

360° panoramic photo can refer to a type of photograph that captures a complete view of an environment. The photo captures a 360° field of view horizontally.

3D volumetric objects can refer to objects within a 360° environment. Users may find cultural objects near their location and interact with them via the application.

3D volumetric video can refer to a video that captures and represents a 3D representation of the object. In one example, multiple cameras are used to capture the object from multiple angles. A user can interact with the 3D volumetric video by rotating or zooming around the object.

3D volumetric characters can refer to animated characters within a 360° environment. In one example, users can interact with these animated characters within a 360° environment.

2D video can refer to any standard video that lacks depth perception. For example, a user can use a 2D video for the live feed for generating the content or Augmented reality experience.

2D photographs, drawings, and other artifacts can refer to visual representations that are captures or created in a two-dimensional format that lacks depth perception.

Audio can refer to any music, soundtrack, or voice recordings a user can use to create the composite layer. For example, a user can record themselves telling an indigenous story.

All of the above experience formats are rendered into the Our Worlds XR360° composite layer using the environmental layer.

The Our Worlds performant XR360° camera view overlay uses a novel approach to performant 360° degree experiences and videos with an optional camera overlay that does not rely on advanced AR technologies for placement and object tracking. The device position and orientation, gathered from the combination of gyroscopic and accelerometer readings, determines the position inside the XR360° experience. Any device movement is tracked in real time and changes the viewing angle and/or position.

Optionally, a camera overlay creates a convincing real time, real object tracking effect that can only be matched with high-powered, state of the art computer vision algorithms. The scalable approach to deliver such experiences is efficient enough to be able to run on low-powered devices with an order of magnitude lower processor power and energy consumption.

Furthermore, the approach is flexible enough to facilitate the creation of such experiences with a dedicated smartphone application. The user can choose the object location placement (x, y coordinates and depth from a top-down view), can select the opacity of the camera overlay and a special 360° background. By adding an audio voice track or music, an immersive experience can be crafted from very little original source material with a very high production value, as shown in FIG. 4.

Our Worlds XR360° Creator Mode

Content creators can create a variety of 360° and volumetric experiences within the application, and the application workflow includes capabilities and tools for recording, mixing, and displaying a broad collection of extended reality formats.

There are different Our Worlds XR360° content formats. Content creators can create and upload a variety of augmented reality and virtual reality content to the Our Worlds content and social media platform and specify various modes of display and presentation settings for this content within an extended reality 360° environment that can be viewed on a mobile phones, tablets, and other media devices within geographical and other contexts.

There are also multiple different Our Worlds XR360° content creation workflows. Content creators can use the proprietary Our Worlds XR360° mobile creator tools within the mobile application to create experiential XR360° content for display on the Our Worlds application. Content creators may also use Our Worlds XR360° desktop workstation creator tools to create experiential XR360° content that can be similarly uploaded to the Our Worlds server and distributed to the Our Worlds mobile application.

Our Worlds XR360° Creator Tools: the XR360° creator mode includes a UI with options for users to specify various settings for their content prior to publishing the content live on the application. Settings include but are not limited to:

Availability On-Demand

The availability on-demand setting allows the content to be made available to users at any geolocation. For example, an augmented reality experience can be centered around the location of Kendall Frost Marsh Reserve in California. However, users at any location can view the content.

Site-Specific Availability

This setting allows content to be available only to users within a site, defined here as a location of 1) a specified proximity to 2) specified geocoordinates, which are both determined by the content creator. Application users located outside of the site will not have access to site-specific content but will be served a rationale message determined by the content creator within the application UI. For example, if the site is defined as Kendall Frost Marsh Reserve in California, only users within a specified proximity to that site can view the content.

Creator Location

A creator location setting creates an optional method for content creators to specify geocoordinates for their physical location at the time of content upload, or another location relevant to the narrative of their content experience.

Temporal Availability

The application UI provides content creators with tools to optionally specify when content will be available. Content creators may choose to make content available all the time, only at certain times of the day and/or only on certain dates, and/or only within specified ranges of time.

Opacity

A content creator can specify an opacity setting for the camera view so that the XR360° content appears to display over the mobile device camera view as a transparent overlay.

Object Distance Content

Creators can specify a distance in some unit of measure (e.g., in meters) between each object they place in an environment layer which will ultimately render the Composite Layer. Object distances can be supplied within any or all of the x, y, or z indices.

Content Format Specification

The Our Worlds system supports the upload, creation and display of a variety of immersive and volumetric formats. It includes a method for the application to determine intelligently the format of the uploaded creator content. It also includes a method for the user to specify the content format and related display parameters for optimal results. Content formats include but are not limited to, those listed above and listed here again described in greater detail.

The app provides methods for content creators to be able to mix and overlay the above (but not limited to the above) formats into video experiences that can then be uploaded and shared to the Our Worlds platform. The Our Worlds XR360° system is format agnostic and can parse content created directly on the user's device; content created with the aid of a 360° video camera attachment, or other 2D and 360° video and photo capabilities available to the camera.

Our Worlds XR360° composite layer is a proprietary media format rendered out in extended reality 360° video comprised of any or all of the following: 2D photos and videos, 360° panoramic photos, virtual reality 360° videos, live-streamed virtual reality 360° videos, 3D volumetric video, 3D volumetric objects, audio, and other digital media. This format is made possible by using a 360° video view as a foundation in which content creators can use any number of digital media and/or digital reality assets which will then be rendered into this 360° environment, and which can be viewed monoscopically or stereoscopically within the application.

Virtual reality 360° videos (hereafter referred to as VR360° video) enables VR360° video camera content uploaded to the user's device from another source which the user then uploads to the app, or 360° video content created directly on the user's device with the aid of a 360° video camera attachment, or other 360° video capabilities available to the camera.

The Our Worlds XR360° system thus provides the ability for users to create, upload, and specify for display a variety of immersive media experiences typically only available individually in discretely different apps.

A social media component of the app provides the ability for users to engage with media experiences by "liking", "sharing" and seeing a badge count of how many times a given media experience has been seen.

A backend application uses a number of different components as described herein. The Our Worlds XR360° environment layer is shown in FIGS. 1 and 4. This Our Worlds XR360° environment layer utilizes media content and settings contributed by creators through the application's creator tools from a mobile device or from a desktop workstation and uploaded to the Our Worlds server. Once there, the content and settings are recorded to a database and collectively assigned a single asset ID. The settings supply the inputs for the Environment Layer algorithms which then render the media content into the XR360° Composite Layer, and which generate a distortion that creates a convincing 360° effect as viewed from within a mobile device either monoscopically or stereoscopically. In this way, a wide variety of digital reality objects can be combined into a single extended reality 360° video experience. Within this system, creators can specify various relationships of each of these digital reality objects to each other, for example, creators can set numerical values to indicate spatial relationships between the objects, so that they may appear at various x, y, and z coordinates in relationship to each other. Creators may also specify temporal relationships between the digital reality objects, so that they may appear and disappear at different times indicated in the settings within the experience, or upon cues from application users as indicated in the settings.

There is also a component that is referred to as the Our Worlds experiential fundraising system. It is widely known in the field of communication studies that people behave differently online or anonymously than in person. This is known as the "Online Disinhibition Effect." Additionally, the Communication theory of cognitive dissonance states that people's behaviors change when inconsistency arises in people's minds between their beliefs and their behaviors. It has been proven that if the inconsistency between belief and behavior becomes too great, the inconsistency will drive a motivational state and influence that human behavior to more closely align the two.

By applying the science of communication and psychology, Our Worlds has created a scientifically based online fundraising tool to drive cognitive consonance and cognitive dissonance. The Our Worlds user interface seeks to reduce "Online Disinhibition Effect" and better align users with their own beliefs and behaviors.

The UI/UX methods described below create a "deliberative continuum" experience to increase fundraising success on mobile apps.

A deep, culturally sensitive understanding of donor psychology and what inspires potential donors to give is at the heart of every donation drive. The application of cognitive psychology in user interaction design is critical to shaping the user experience and influencing user actions.

The technology includes specific positive and negative psychological responses built into the UI/UX to compel users to be more generous than they otherwise would be without the built-in psychological prompting.

The Our Worlds fundraising application provides a method utilizing an array of UI/UX devices that have been designed and developed taking these factors into account in order to appeal to the emotions of potential donors and influence them to donate. The fundraising application is comprised of the following features:

While many donation drive campaigns on digital platforms such as apps and websites present a prominently-placed donation request to users upon page launch, the Our Worlds fundraising application diverges from this paradigm by presenting the pitch only after offering users free content on its media platform.

A pitch is presented in the form of an experiential activity. After the conclusion of the free content experience, a simple color field screen fades into view with a minimally worded prompt (see FIG. 8). The prompt uses phrasing that is easy to understand and neutrally worded so as to not immediately suggest a request for donation. For example, this might include a phrase such "Support Us" as the title, and "Tell me more" rendered in a smaller type size below it as the opt-in label. A small exit icon on the top right corner of the screen allows users to discover a way to exit the page, appealing to their sense of fair play by allowing them to decline in an elegant way, while not making this option overly prominent. ~75% of the page is a blank color field.

Once the user has opted in, another color field page fades in comprised of:

~50% blank color field.

A statement of purpose, e.g., "Together we can empower indigenous voices," where the wording suggests a shared mission and alignment of values to help others.

A call to action, e.g., "Please choose an amount."

A slider comprised of the following features to create a "deliberative continuum" experience for the potential donor:

A donation range is distributed so that the highest amount appears on the left and lowest amount appears on the right, reversing the expectation that values typically increase left to right along an x axis. Studies have shown that in western culture people favor turning and moving towards the right; in the case of the slider, the right-most options display increasingly lower numbers. By anticipating that users would tend to move the slider to the right first, and presenting them with decreasing amounts in that direction, the user feels less pressured and is more open to exploring the slider further and spending more time on the page.

The donation range distribution also places an emphasis on the "likeliest" donation amounts by giving that range of values more space on the slider, e.g., more distance between the values so that these amounts appear before the user for slightly increased amounts of time for a subtle suggestive effect. This feature also provides a method to the app publisher to adjust this range dynamically for each media experience, or auction item, so that each could potentially have a different emphasis range and default slider position at a particular dollar amount of per individual content.

The slider controller can be manipulated in the code to default to appear at what the app publishers deem as the likeliest amount for people to donate. The user is prompted to move the slider, which causes a smooth, pleasing gradient animation, from warm, pleasing colors for mid-range and high donation amounts to cool, less chromatic colors for lower donation amounts.

The final option, no donation (nothing) is labeled in a small font and rendered with a non-chromatic grey background to reinforce a negative connotation for not donating. It is also a way to exit the process, and as such is given the least amount of real estate on the slider, making it the most difficult amount to access on the slider.

Additional features can include messages for defined donation ranges, where a series of phrases just above the slider, characterizing each donation range with a phrase that triggers positive psychological feedback based on positive connotations and cognitive consonance/word association. Each price point along the timeline is emphasized as the user scrolls the slider with haptic and audio feedback for positive psychological effects.

Figure 9:
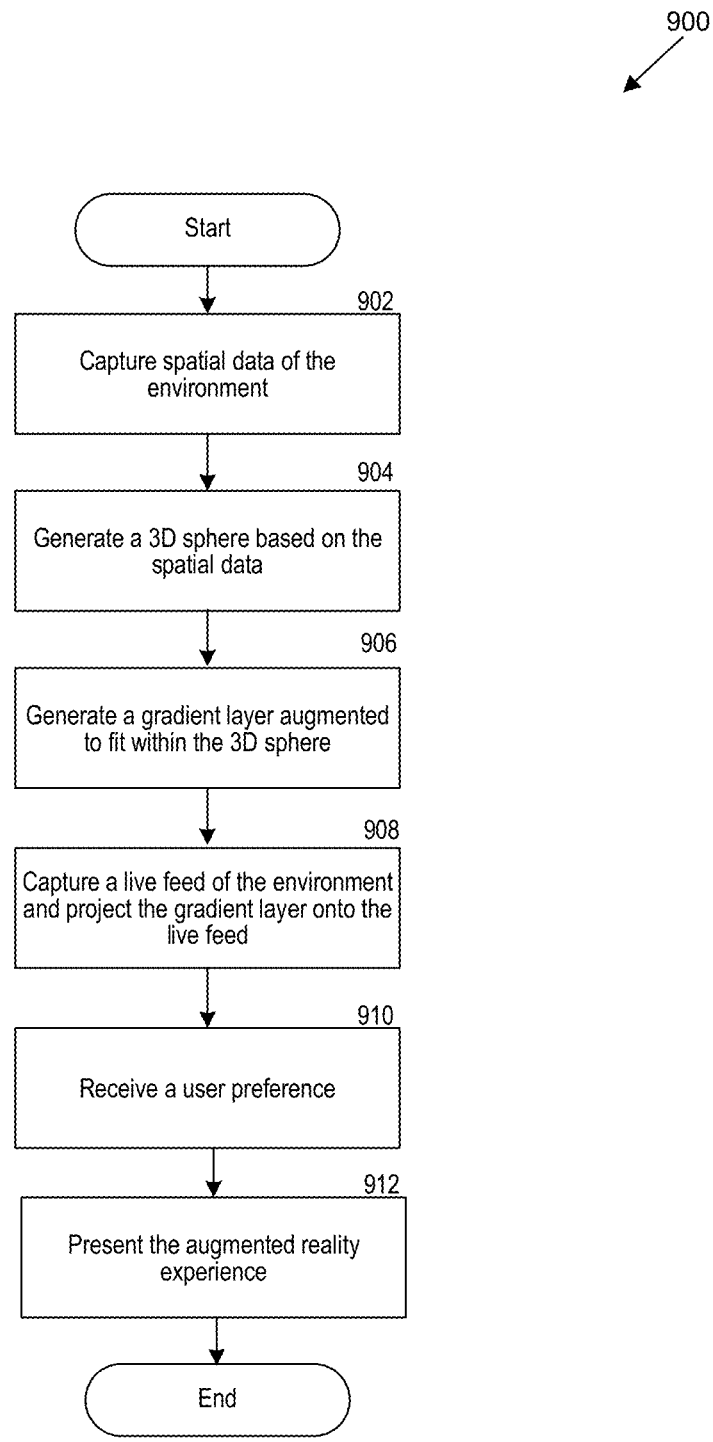
FIG. 9 is a flow diagram that illustrates a method for generating a shareable AR view.

FIG. 9 is a flow diagram that illustrates a method 900 for generating a shareable augmented reality of an environment. The method 900 can be performed by a system including, for example, a handheld mobile device (e.g., smartphone) and/or a server coupled to the handheld mobile device. In one example, the handheld mobile device includes a visualization sensor, an accelerometer, a gyroscope sensor, and a display device (e.g., touchscreen). The handheld mobile device and/or server include at least one hardware processor, and at least one non-transitory memory storing instructions that, when executed by the at least one hardware processor, cause the system to perform the method 900.

At 902, the system causes the visualization sensor to capture spatial data of an environment. The visualization sensor is disposed in the handheld mobile device and configured to capture the spatial data when scanning the handheld mobile device across the environment. For example, the system causes the visualization sensor (e.g., camera) to capture spatial data of a user-chosen territory. By doing so, the system can capture the dimensions of the environment to present the augmented reality experience.

In one embodiment, the system displays a set of mandatory input instructions to the user. In particular, when capturing spatial data, the system displays a set of mandatory input instructions to the first user. The set of mandatory input instructions may include visual feedback. In response to detecting the first user has completed the set of mandatory instructions based on motion data from the accelerometer sensor and the gyroscope sensor, the system generates auditory feedback. For example, the system can utilize a user calibration tool. When starting the augmented reality experience, the user is presented with an arrow indicating the misalignment of the device in combination with a short phrase such as "tilt the phone up a little." Once the user tilts their phone, visual feedback is given instantaneously in the form of the arrows changing their angle. Once the user reaches the correct angle and orientation, the wording can change to "hold still." In addition to visual stimuli, a short vibration of the device will also reaffirm the user of their correct action. Once the device is held in the correct position for a minimum time (e.g., a two seconds), the label once again changes to remember to look around. Then, a jingle (e.g., audio feedback) is played to reward the user for performing the correct action. By doing so, the system establishes the correct device orientation, while allowing the user to correctly capture spatial data.

At 904, the system generates a 3D sphere based on the spatial data. In particular, the system generates a 3D sphere based on the spatial data or the environment. The accelerometer sensor and the gyroscope sensor disposed in the handheld device are configured to determine whether the handheld mobile device is in an initial position. For example, the system starts to construct a 3D sphere, which is used as a surface to project the augmented reality experience (e.g., a 360-degree video file) onto the environment. At the same time, the orientation and angle of this sphere is rotated together with the devices' gyroscope and accelerometer sensors. By doing so, the system can generate a 3D base layer of 360-degree video of the Augmented reality experience.

At 906, the system generates a gradient layer augmented to fit within the 3D sphere. The gradient layer comprises a gradient ratio. The gradient ratio may include a ratio of a portion of the gradient layer comprising a translucent area to a portion of the gradient layer comprising a black area. The gradient ratio is adjusted depending on a determined angle of the handheld mobile device captured by the accelerometer sensor and the gyroscope sensor. For example, once the 3D sphere is generated (e.g., 3D base layer of 360-degree video), the system constructs the gradient layer. In the initial state of the gradient layer, the device is perfectly aligned upright towards the horizon and the upper 50% of the gradient layer is black. Then the black smoothly fades into the lower 50% translucent area. In real-time, the gradient ratio is adjusted depending on the angle of the device toward the horizon. If the handheld mobile device is facing towards the sky at a zero-degree angle, the entire gradient becomes black. When the handheld mobile device is oriented towards the ground (e.g., the screen of the handheld mobile device is facing towards the user), the gradient layer becomes entirely translucent. By doing so, the system can track any device movement in real-time and reflect changes in the Augmented reality experience.

At 908, the system causes the visualization sensor to capture a live feed of the environment and project the gradient layer onto the live feed. In particular, the system captures, using the visualization sensor, a live feed of the environment and project the gradient layer onto the live feed based on the gradient ratio to generate an environment layer. In response to a high gradient ratio, the handheld mobile device is prevented from projecting the live feed. An Augmented reality experience is based on the environment layer. For example, a live feed of the device camera is projected onto the gradient layer. The system avoids projecting the feed onto completely transparent pixels of the gradient layer. By doing so, the system achieves a natural-looking blend between the user's environment and the underlying 360° video. Through movements, both the underlying sphere, as well as the gradient layer the user is able to pan and tilt in order to view different viewports of the 360° video, convincingly projected into reality.

At 910, the system receives a user preference. In particular, the system receives, from a first user, a user preference for the augmented reality experience. The first user is the creator of the augmented reality experience. For example, the system includes a user interface with options for users to specify settings for the content (e.g., the augmented reality experience) before sharing the content.

In one embodiment, the user (e.g., creator) can limit the availability for other users to view the generated augmented reality experience. For example, the creator can limit the content to be available at specific locations. For instance, the system can limit the augmented reality experience to the creator's location at the time of upload. In another instance, the system can limit the augmented reality experience to be viewed at a specific site by receiving specified geocoordinates from the user.

In another embodiment, the user (e.g., creator) can limit the generated augmented reality experience to be viewed at a specific time period. For example, the user can designate content available all the be, only at certain times of the day and/or only on certain dates, and/or only within specified ranges of time.

In another embodiment, the user (e.g., creator) can adjust the generated augmented reality experience. For example, the user can adjust the opacity or the distance in between objects in the content. In another example, the user can add audio or change display parameters for the generated augmented reality experience.

At 912, the system presents the augmented reality experience. In particular, the system presents, on the display device, the augmented reality experience based on the environment layer. For example, after the first user publishes the augmented reality experience, a second user (e.g., a viewer) can view the augmented reality experience on their device (e.g., the display device).

Figure 10:
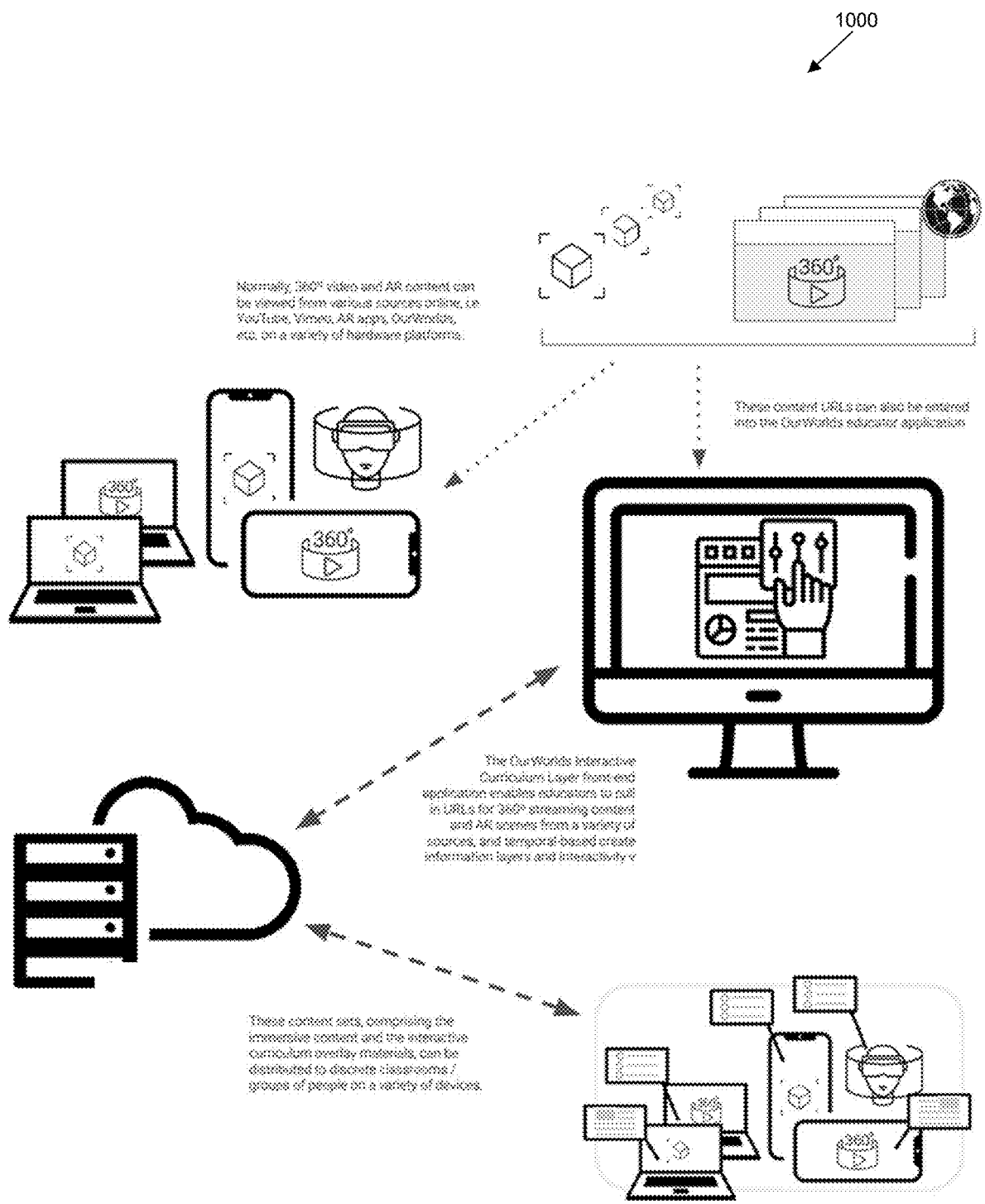
FIG. 10 is a block diagram that illustrates an interactive curriculum layer.

FIG. 10 is a block diagram that illustrates an interactive curriculum layer 1000 of the disclosed technology. The interactive curriculum layer is a feature of the OurWorlds XR360° experiences. This feature provides tools for users such as curriculum developers and teachers to efficiently create powerful interactive components to add to the OurWorlds XR360° experiences. For example, users can include surveys, quizzes, or links to additional XR experiences. In another example, the users can add images, audio recordings, and other resources to the 360° immersive spaces.

The interactive curricula overlay is a significant contribution to the learning engineering paradigm. As immersive realities become increasingly integrated with K-12 education, it is critical to innovate ways for curriculum designers to have the ability to guide students through augmented reality experiences efficiently. This will allow teachers to help students parse primary source augmented reality experiences. This will also provide teachers agency in connecting augmented reality experiences with what they are teaching in their classrooms without distracting from the power of the experiences themselves.

Any 360° video or photo, or any augmented reality object scene can be added to the XR360° platform. Within this platform, authenticated educator users can add a variety of content and specify temporal parameters for its appearance, performance, interactivity, and other features.

The interactive curricula overlay component of the XR360° platform includes back-end and front-end components. The backend components include a web-based user interface connected to a database maintained by a parent organization (e.g., OurWorlds) that enables authenticated authorities (e.g., educators and curriculum designers) to create and inject a variety of elements into an interactive, XR360° experience. The frontend component enables authenticated end users (e.g., students) to engage with these elements. An anonymized tracking mechanism captures Children's Online Privacy Protection Rule (COPPA) compliant user engagement metrics by the end users that are accessible by the authenticated authorities as well as the parent organization.

Computer System

Figure 11:
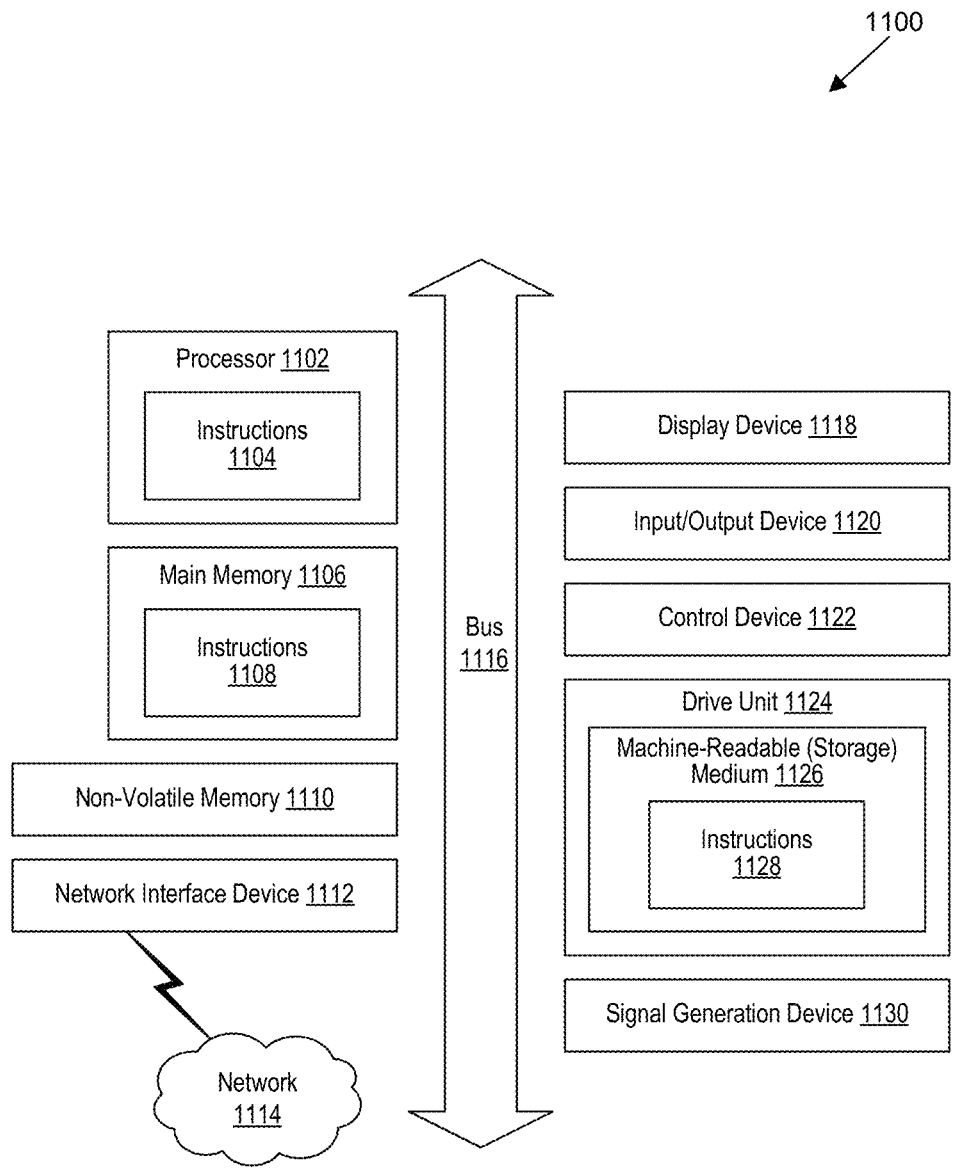
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, video display device 1118, an input/output device 1120, a control device 1122 (e.g., keyboard and pointing device), a drive unit 1124 that includes a storage medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementation, the computer system 1100 can be an embedded computer system, a system-on-chip (SOC), a single-board computer system (SBC) or a distributed system such as a mesh of computer systems or include one or more cloud components in one or more networks. Where appropriate, one or more computer systems 1100 can perform operations in real-time, near real-time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable (storage) medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system operable to generate a shareable augmented reality experience of an environment, the system comprising:
   a handheld mobile device including:
      a visualization sensor;
      an accelerometer sensor;
      a gyroscope sensor;
      a display device;
      at least one hardware processor; and
      at least one non-transitory memory storing instructions, which, when executed by the at least one hardware processor, cause the system to:
      cause the visualization sensor to capture spatial data of the environment,
         wherein the visualization sensor is disposed in the handheld mobile device and configured to capture the spatial data when scanning the handheld mobile device across the environment;
      generate a three-dimensional (3D) sphere based on the spatial data or the environment,
         wherein the accelerometer sensor and the gyroscope sensor disposed in the handheld device are configured to determine a position of the handheld mobile device;
      generate a gradient layer augmented to fit within the 3D sphere,
         wherein the gradient layer comprises a gradient ratio,
         wherein the gradient ratio comprises a ratio of a portion of the gradient layer comprising a translucent area to a portion of the gradient layer comprising a black area, and
         wherein the gradient ratio is adjusted depending on a determined angle of the handheld mobile device captured by the accelerometer sensor and the gyroscope sensor;
      capture, using the visualization sensor, a live feed of the environment and project the gradient layer onto the live feed based on the gradient ratio to generate an environment layer,
         wherein in response to a high gradient ratio, the handheld mobile device is prevented from projecting the live feed, and
         wherein an augmented reality experience is based on the environment layer;
      receive, from a first user, a user preference for the augmented reality experience,
         wherein the first user is a creator of the augmented reality experience; and
      present, on the display device, the augmented reality experience based on the environment layer.

2. The system of claim 1, wherein capturing spatial data of the environment further causes the handheld mobile device to:
   display a set of mandatory instructions to the first user,
      wherein the mandatory instructions are instructions that cannot be skipped by the user, and
      wherein the set of mandatory instructions comprises visual feedback; and
   in response to detecting the first user has satisfied the set of mandatory instructions based on motion data from the accelerometer sensor and the gyroscope sensor, generating auditory feedback.

3. The system of claim 1, wherein receiving the user preference for the augmented reality experience further causes the system to determine that the user preference comprises an availability preference, wherein the availability preference comprises setting the augmented reality experience to be available to users at any geolocation.

4. The system of claim 1, wherein receiving the user preference for the augmented reality experience further causes the system to:
   determine the user preference comprises a site availability preference;
   transmit, to the first user, a site location request; and
   in response to receiving a site location, set the augmented reality experience to be available to users at a set of geocoordinates associated with the site.

5. The system of claim 1, wherein receiving the user preference for the augmented reality experience further causes the system to:
   determine the user preference comprises a creator location availability preference;
   transmit, to the first user, a creator location request; and
   in response to receiving a creator location, set the augmented reality experience to be available to users at a set of geocoordinates associated with the creator.

6. The system of claim 1, wherein receiving the user preference for the augmented reality experience further causes the system to:
   determine the user preference comprises a time availability preference;
   transmit, to the first user, a time period request; and
   in response to receiving a time period, set the augmented reality experience to be available to users at the time period chosen by the first user.

7. The system of claim 1, wherein receiving the user preference for the augmented reality experience further causes to system to:
   determine the user preference comprises an opacity preference; and
   in response to receiving an opacity preference, adjust the gradient ratio associated with the augmented reality experience.

8. The system of claim 1, wherein receiving the user preference for the augmented reality experience further causes the system to:
   determine the user preference comprises a distance preference;
   transmit, to the first user, a first request for a set of objects to update and a second request for a distance;
   in response to receiving a first response to the first request and a second response to the second request, update the set of objects to the distance in the environment layer.

9. The system of claim 1, wherein receiving the user preference for the augmented reality experience further causes the system to determine the user preference comprises a user availability preference, wherein the availability preference comprises setting the augmented reality experience to be available to a specific set of users.

10. The system of claim 1 further comprising:
    an image recognition machine learning engine configured to operate on a dataset including data items of multiple objects and multiple environments.

11. The system of claim 1, wherein receiving the user preference for the augmented reality experience further causes the system to:
    determine that the user preference comprises a content preference;
    transmit, to the first user, a content request for content to add;
    in response to receiving a response to the content request, generate additional content and update the environment layer.

12. A non-transitory, computer-readable storage medium comprising instructions recorded thereon that, when executed by at least one processor of a system, cause the system to:
- cause a visualization sensor to capture spatial data of an environment,
  - wherein the visualization sensor is disposed in a handheld mobile device and configured to capture the spatial data by scanning the handheld mobile device across the environment;
- generate a three-dimensional (3D) sphere based on the spatial data or the environment,
  - wherein an accelerometer sensor and a gyroscope sensor disposed in the handheld device are configured to determine a position of the handheld mobile device;
- generate a gradient layer augmented to fit within the 3D sphere,
  - wherein the gradient layer comprises a gradient ratio,
  - wherein the gradient ratio comprises a ratio of a portion of the gradient layer comprising a translucent area to a portion of the gradient layer comprising a black area, and
  - wherein the gradient ratio is adjusted depending on a determined angle of the handheld mobile device captured by the accelerometer sensor and the gyroscope sensor;
- capture, using the visualization sensor, a live feed of the environment and project the gradient layer onto the live feed based on the gradient ratio to generate an environment layer,
  - wherein in response to a high gradient ratio, the handheld mobile device is prevented from projecting the live feed, and
  - wherein an augmented reality experience is based on the environment layer;
- receive, from a first user, a user preference for the augmented reality experience,
  - wherein the first user is a creator of the augmented reality experience; and
- present, on a display device, the augmented reality experience based on the environment layer.

13. The non-transitory, computer-readable storage medium of claim 12, wherein capturing spatial data of the environment further causes the handheld mobile device to:
- display a set of mandatory instructions to the first user; and
- in response to detecting the first user has satisfied the set of mandatory instructions based on motion data from the accelerometer sensor and the gyroscope sensor, generating feedback.

14. The non-transitory, computer-readable storage medium of claim 12, wherein receiving the user preference for the augmented reality experience further causes the system to:
- determine the user preference comprises an availability preference,
  - wherein the availability preference comprises setting the augmented reality experience to be available to users at any geolocation.

15. The non-transitory, computer-readable storage medium of claim 12, wherein receiving the user preference for the augmented reality experience further causes the system to:
- determine the user preference comprises a site availability preference;
- transmit, to the first user, a site location request; and
- in response to receiving a site location, set the augmented reality experience to be available to users at a set of geocoordinates associated with the site.

16. A method for generating a shareable augmented reality experience of an environment, the method comprising:
- causing a visualization sensor to capture spatial data of an environment,
  - wherein the visualization sensor is disposed in a handheld mobile device and configured to capture the spatial data by scanning the handheld mobile device across the environment;
- generating a three-dimensional (3D) sphere based on the spatial data or the environment,
  - wherein an accelerometer sensor and a gyroscope sensor disposed in the handheld device are configured to determine that the handheld mobile device is in an initial position;
- generating a gradient layer augmented to fit within the 3D sphere,
  - wherein the gradient layer comprises a gradient ratio,
  - wherein the gradient ratio comprises a ratio of a portion of the gradient layer comprising a translucent area to a portion of the gradient layer comprising a black area, and
  - wherein the gradient ratio is adjusted depending on a determined angle of the handheld mobile device captured by the accelerometer sensor and the gyroscope sensor;
- capturing, using the visualization sensor, a live feed of the environment and project the gradient layer onto the live feed based on the gradient ratio to generate an environment layer,
  - wherein in response to a high gradient ratio, the handheld mobile device is prevented from projecting the live feed, and
  - wherein an augmented reality experience is based on the environment layer;
- receiving, from a first user, a user preference for the augmented reality experience,
  - wherein the first user is a creator of the augmented reality experience; and
- presenting, on a display device, the augmented reality experience is based on the environment layer.

17. The method of claim 16, wherein receiving the user preference for the augmented reality experience comprises:
- determining the user preference comprises a creator location availability preference;
- transmitting, to the first user, a creator location request; and
- in response to receiving a creator location, setting the augmented reality experience to be available to users at a set of geocoordinates associated with the creator.

18. The method of claim 16, wherein receiving the user preference for the augmented reality experience comprises:
- determining the user preference comprises a time availability preference;
- transmitting, to the first user, a time period request; and
- in response to receiving a time period, setting the augmented reality experience to be available to users at the time period chosen by the first user.

19. The method of claim 16, wherein receiving the user preference for the augmented reality experience comprises:
- determining the user preference comprises an opacity preference; and in response to receiving an opacity preference, adjusting the gradient ratio associated with the augmented reality experience.

20. The method of claim 16, wherein receiving the user preference for the augmented reality experience comprises:
determining the user preference comprises a distance preference;
transmitting, to the first user, a first request for a set of objects to update and a second request for a distance;
in response to receiving a first response to the first request and a second response to the second request, updating the set of objects to the distance in the environment layer.

\* \* \* \* \*